US012676158B2

(12) United States Patent
Laaksonen

(10) Patent No.: US 12,676,158 B2
(45) Date of Patent: Jul. 7, 2026

(54) DELAYED ORIENTATION SIGNALLING FOR IMMERSIVE COMMUNICATIONS

(71) Applicant: Nokia Technologies Oy, Espoo (FI)

(72) Inventor: Lasse Juhani Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 157 days.

(21) Appl. No.: 18/698,220

(22) PCT Filed: Oct. 12, 2021

(86) PCT No.: PCT/EP2021/078115
§ 371 (c)(1),
(2) Date: Apr. 3, 2024

(87) PCT Pub. No.: WO2023/061556
PCT Pub. Date: Apr. 20, 2023

(65) Prior Publication Data
US 2025/0225988 A1 Jul. 10, 2025

(51) Int. Cl.
*G10L 19/008* (2013.01)
*H04S 7/00* (2006.01)

(52) U.S. Cl.
CPC .............. *G10L 19/008* (2013.01); *H04S 7/30* (2013.01); *H04S 2400/11* (2013.01); *H04S 2400/15* (2013.01)

(58) Field of Classification Search
CPC ....... G10L 19/008; G10L 19/167; H04S 7/30; H04S 2400/11; H04S 2400/15
(Continued)

(56) References Cited

U.S. PATENT DOCUMENTS 5,146,507 A 9/1992 Satoh et al.
10,848,894 B2 11/2020 Laaksonen et al.
(Continued)

FOREIGN PATENT DOCUMENTS

CN 110082724 A * 8/2019 ............... G01S 5/18
WO 2020/102153 A1 5/2020
(Continued)

OTHER PUBLICATIONS

"IVAS Permanent document IVAS-2: IVAS Project Plan, v.0.1.0", 3GPP SA4#111e, Tdoc S4-201617, Agenda: 15.1, IVAS Co-Rapporteur1, Nov. 11-20, 2020, pp. 1-4.
"Description of the IVAS MASA C Reference Software", 3GPP TSG-SA4#106 meeting, Tdoc S4-191167, Agenda: 7.5, Nokia Corporation, Oct. 21-25, 2019, pp. 1-16.
(Continued)

*Primary Examiner* — George C Monikang
(74) *Attorney, Agent, or Firm* — ALSTON & BIRD LLP

(57) ABSTRACT

There is disclosed apparatus for encoding a spatial audio scene comprising means configured to: determine, for an audio frame of at least one audio signal of the spatial audio scene, a change to the orientation of the apparatus, wherein the change to the orientation of the apparatus is respect to an orientation of the apparatus from a previous audio frame of the at least one audio signal, wherein the change to the orientation of the apparatus forms at least one orientation change value which forms at least part of an orientation change data set; determine an orientation change delay time for the change to the orientation of the apparatus, wherein the orientation delay time forms a further part of the orientation change data set; and perform the change to the orientation of the apparatus after a period of time specified by the orientation change delay time.

20 Claims, 10 Drawing Sheets

(58) Field of Classification Search
USPC .................................................. 381/303–304
See application file for complete search history.

(56) References Cited

U.S. PATENT DOCUMENTS

| | | | |
|---|---|---|---|
| 2014/0003635 A1 | 1/2014 | Mohammad et al. | |
| 2018/0098174 A1 | 4/2018 | Goodwin et al. | |
| 2020/0053500 A1 | 2/2020 | Tran | |
| 2020/0104620 A1 | 4/2020 | Cohen et al. | |
| 2023/0061241 A1* | 3/2023 | McNicholas | G06F 3/165 |

FOREIGN PATENT DOCUMENTS

| | | |
|---|---|---|
| WO | 2021/003569 A1 | 1/2021 |
| WO | 2021/069792 A1 | 4/2021 |

OTHER PUBLICATIONS

"3rd Generation Partnership Project; Technical Specification Group Services and System Aspects; Codec for Enhanced Voice Services (EVS); Detailed Algorithmic Description (Release 16)", 3GPP TS 26.445, V16.1.1, Oct. 2020, pp. 1-661.

Singer et al., "A General Mechanism for RTP Header Extensions", RFC 8285, Internet Engineering Task Force (IETF), Oct. 2017, pp. 1-25.

Zotkin et al., "Rendering Localized Spatial Audio in a Virtual Auditory Space", IEEE Transactions on Multimedia, vol. 06, No. 04, Aug. 2004, pp. 1-29.

International Search Report and Written Opinion received for corresponding Patent Cooperation Treaty Application No. PCT/EP2021/078115, dated Jul. 13, 2022, 12 pages.

"Signaling for Audio mixing gain", 3GPP TSG-SA4 Meeting SA4#113-e, S4-210534, Agenda: 12.5, Tencent, Apr. 6-14, 2021, pp. 1-3.

* cited by examiner

DELAYED ORIENTATION SIGNALLING FOR IMMERSIVE COMMUNICATIONS

RELATED APPLICATION

This application claims priority to PCT Application No. PCT/EP2021/078115, filed on Oct. 12, 2021, which is incorporated herein by reference in its entirety.

FIELD

The present application relates to apparatus and methods for delaying enhanced orientation signalling for immersive communications, but not exclusively for enhanced orientation signalling for immersive communications within a spatial audio signal environment.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

SUMMARY

There is provided according to a first aspect an apparatus for encoding a spatial audio scene comprising means configured to: capture the spatial audio scene comprising at least one audio signal; determine, for an audio frame of the at least one audio signal, a change to the orientation of the apparatus, wherein the change to the orientation of the apparatus is respect to an orientation of the apparatus from a previous audio frame of the at least one audio signal, wherein the change to the orientation of the apparatus forms at least one orientation change value which forms at least part of an orientation change data set; determine an orientation change delay time for the change to the orientation of the apparatus, wherein the orientation delay time forms a further part of the orientation change data set; perform the change to the orientation of the apparatus after a period of time specified by the orientation change delay time; and output or store the orientation change data set.

The orientation change delay time may be expressed in units of audio frames of the at least one audio signal.

The at least one orientation change value may comprise at least one of: an azimuth value, an elevation value and a roll value.

The apparatus comprising means configured to output or store the orientation change data set may further comprises means configured to form the at least one of the orientation change data set as an RTP header extension according to RFC8285.

The RTP header extension may comprise a L field according to RFC 8285, and wherein a value of the L field indicates that the RTP header extension contains at least one of the azimuth value, the elevation value, the roll value and the orientation change delay time.

The RTP header extension is a one-byte header extension according to RFC8285.

According to a second aspect there is provided an apparatus for decoding a spatial audio scene, comprising means configured to: receive an orientation change data set, wherein the orientation change data set comprises: at least one orientation change value specifying a change to an orientation of the apparatus with respect to the spatial audio scene comprising at least one audio signal; and an orientation change delay time for the change to the orientation of the apparatus; and perform the change to the orientation of the apparatus, wherein the change to the orientation of the apparatus is performed within a period of time specified by the orientation change delay time.

The orientation change delay time may be expressed in units of audio frames of the at least one audio signal.

The means configured to perform a change to the orientation of the apparatus may comprise means configured to: determine an increment of change with respect to the at least one orientation change value.

The increment of change may be a linear increment of change, the means configured to determine the increment of change may comprise means configured to determine a factor relating to a ratio of the at least one orientation change value to the orientation delay time.

The means configured to perform the change to the orientation of the apparatus may comprise means further configured to: apply the increment of change to the orientation of the apparatus on an audio frame by audio frame basis of the at least one audio signal for the period of time specified by the orientation change delay time.

Alternatively, the apparatus may comprise a signal activity detection function, and the means configured to perform the change to the orientation of the apparatus may comprise means further configured to: apply the increment of change to the orientation of the apparatus on an audio frame by audio frame basis of the at least one audio signal when the signal activity function indicates an active audio signal state; and apply a change to the orientation of the apparatus such that the at least one orientation change value is reached over a period of an audio frame of the at least one audio signal when the signal activity detection function indicates an inactive audio signal.

Alternatively, the means configured to perform a change to the orientation of the apparatus may comprise means further configured to: override the change to the orientation of the apparatus by not performing the change to the orientation of the apparatus.

The at least one orientation change value may comprises at least one of; an azimuth value, an elevation value and a roll value.

The orientation change data set may be received in the form of an RTP header extension according to RFC8285.

The RTP header extension may comprise a L field according to RFC 8285, and wherein a value of the L field indicates that the RTP header extension contains at least one of the azimuth value, the elevation value, the roll value and the orientation change delay time.

The RTP header extension may be a one-byte header extension according to RFC8285.

According to a third aspect there is a method for encoding a spatial audio scene comprising: capturing the spatial audio scene comprising at least one audio signal; determining, for an audio frame of the at least one audio signal, a change to the orientation of an apparatus, wherein the change to the orientation of the apparatus is respect to an orientation of the apparatus from a previous audio frame of the at least one audio signal, wherein the change to the orientation of the apparatus forms at least part one orientation change value which forms at least part of an orientation change data set; determining an orientation change delay time for the change to the orientation of the apparatus, wherein the orientation delay time forms a further part of the orientation change data set; performing the change to the orientation of the apparatus after a period of time specified by the orientation change delay time; and outputting or storing the orientation change data set.

The orientation change delay time may be expressed in units of audio frames of the at least one audio signal.

The at least one orientation change value may comprise at least one of: an azimuth value, an elevation value and a roll value.

The method comprising means outputting or storing the orientation change data set may further comprise forming the at least one of the orientation change data set as an RTP header extension according to RFC8285.

The RTP header extension may comprise a L field according to RFC 8285, and wherein a value of the L field indicates that the RTP header extension contains at least one of the azimuth value, the elevation value, the roll value and the orientation change delay time.

The RTP header extension may be a one-byte header extension according to RFC8285.

According to a fourth there is a method for decoding a spatial audio scene, comprising: receiving an orientation change data set, wherein the orientation change data set comprises: at least one orientation change value specifying a change to an orientation of an apparatus with respect to the spatial audio scene comprising at least one audio signal; and an orientation change delay time for the change to the orientation of the apparatus; and performing the change to the orientation of the apparatus, wherein the change to the orientation of the apparatus is performed within a period of time specified by the orientation change delay time.

The orientation change delay time may be expressed in units of audio frames of the at least one audio signal.

Performing a change to the orientation of the apparatus may comprise determining an increment of change with respect to the orientation change value.

The increment of change may be a linear increment of change and determining the increment of change may comprise determining a factor relating to a ratio of the at least one orientation change value to the orientation delay time.

Performing the change to the orientation of the apparatus may further comprise: applying the increment of change to the orientation of the apparatus on an audio frame by audio frame basis of the at least one audio signal for the period of time specified by the orientation change delay time.

Alternatively, the apparatus may comprise a signal activity detection function, and performing the change to the orientation of the apparatus may further comprise: applying the increment of change to the orientation of the apparatus on an audio frame by audio frame basis of the at least one audio signal when the signal activity function indicates an active audio signal state; and applying a change to the orientation of the apparatus such that the at least one orientation change value is reached over a period of an audio frame of the at least one audio signal when the signal activity detection function indicates an inactive audio signal.

Alternatively, performing a change to the orientation of the apparatus may further comprise overriding the change to the orientation of the apparatus by not performing the change to the orientation of the apparatus.

The at least one orientation change value of the user may comprise at least one of; an azimuth value, an elevation value and a roll value.

The orientation change data set may be received in the form of an RTP header extension according to RFC8285.

The RTP header extension may comprise a L field according to RFC 8285, and wherein a value of the L field indicates that the RTP header extension contains at least one of the azimuth value, the elevation value, the roll value and the orientation change delay time.

The RTP header extension may be a one-byte header extension according to RFC8285.

According to a fifth aspect there is an apparatus comprising at least one processor and at least one memory including a computer program code, the at least one memory and the computer program code configured to, with the at least one processor, cause the apparatus at least to: capture the spatial audio scene comprising at least one audio signal; determine, for an audio frame of the at least one audio signal, a change to the orientation of the apparatus, wherein the change to the orientation of the apparatus is respect to an orientation of the apparatus from a previous audio frame of the at least one audio signal, wherein the change to the orientation of the apparatus forms at least one orientation change value which forms at least part of an orientation change data set; determine an orientation change delay time for the change to the orientation of the apparatus, wherein the orientation delay time forms a further part of the orientation change data set; perform the change to the orientation of the apparatus after a period of time specified by the orientation change delay time; and output or store the orientation change data set.

According to a sixth aspect there is an apparatus comprising at least one processor and at least one memory including a computer program code, the at least one memory and the computer program code configured to, with the at least one processor, cause the apparatus at least to: receive an orientation change data set, wherein the orientation change data set comprises: at least one orientation change value specifying a change to an orientation of the apparatus with respect to the spatial audio scene comprising at least one audio signal; and an orientation change delay time for the change to the orientation of the apparatus; and perform the change to the orientation of the apparatus, wherein the change to the orientation of the apparatus is performed within a period of time specified by the orientation change delay time.

According to a seventh aspect there is a non-transitory computer readable medium comprising program instructions for causing an apparatus to perform at least the following: capturing the spatial audio scene comprising at least one audio signal; determining, for an audio frame of the at least one audio signal, a change to the orientation of an apparatus, wherein the change to the orientation of the apparatus is respect to an orientation of the apparatus from a previous audio frame of the at least one audio signal, wherein the change to the orientation of the apparatus forms at least part one orientation change value which forms at least part of an orientation change data set; determining an orientation change delay time for the change to the orientation of the apparatus, wherein the orientation delay time forms a further part of the orientation change data set; performing the change to the orientation of the apparatus after a period of time specified by the orientation change delay time; and outputting or storing the orientation change data set.

According to an eighth aspect there is a non-transitory computer readable medium comprising program instructions for causing an apparatus to perform at least the following: receiving an orientation change data set, wherein the orientation change data set comprises: at least one orientation change value specifying a change to an orientation of an apparatus with respect to the spatial audio scene comprising at least one audio signal; and an orientation change delay time for the change to the orientation of the apparatus; and performing the change to the orientation of the apparatus, wherein the change to the orientation of the apparatus is performed within a period of time specified by the orientation change delay time.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for a delayed orientation signalling for user-controlled spatial audio rendering.

There exists a problem for user-controlled spatial audio rendering when there is an update to the intended scene orientation.

A typical example of capturing spatial audio may involve a user walking down a busy road using a mobile device in a normal manner. In this scenario the user may take a turn or rotate their head to check for traffic resulting in rapid changes to the orientation of the spatial audio capturing device (mobile device). These changes to the spatial audio scene orientation tend to be rather random in nature and generally not of interest to the end user. These unintended changes to the spatial audio scene orientation may be compensated for in the design of the audio capture apparatus. For example, during the capture process orientation sensors may be used to rotate the captured audio scene such that a resulting audio scene may be stabilised.

There may be instances when there is an intended change to the audio scene which is required to be communicated to the end user. However, inadvertently the changes to the audio scene may also comprise unwanted annoying changes to the end user. An example of such an instance may be viewed by a user selecting a particular orientation when capturing starts. The transmission may include scene information having a first rotation value for the audio scene orientation. The user may then wish to bring to the listener's attention a particular directional aspect of the sound scene. The user's device may in response to a command transmit a new scene orientation instantaneously. However, depending on the circumstances of the changes, such as the magnitude or frequency of change, the signalled orientation update to the receiving renderer may result in annoying spatial audio scene artifacts to the end user.

Figure 1:
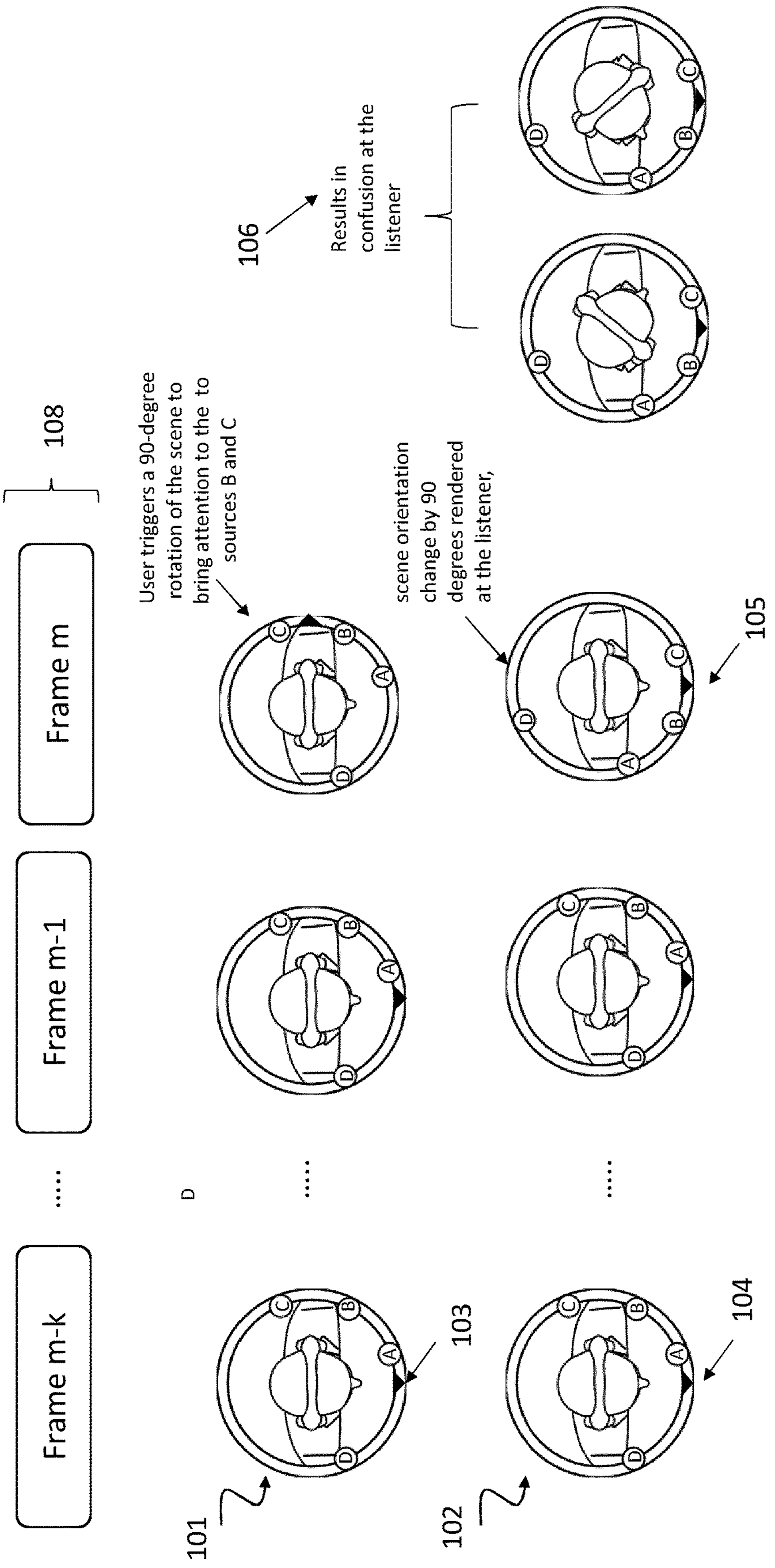
FIG. 1 show schematically a typical audio transmission scenario which may be experienced by a user.

FIG. 1 illustrates the above problem in relation to a user 101 and a listener 102 at various time frame instances 108. The user 101 is shown as capturing a sound scene having audio sources A, B, C, D. The arrow 103 denotes the orientation of the audio scene, where it can be seen the front lies between the audio sources A and D. The sound scene is shown as being stable for K−1 frames. The listener is shown as 102 in FIG. 1, where the equipment (e.g., head-tracked headphones) of listener 102 is rendering the audio scene in accordance with the orientation of the user 101. This is shown by the arrow 104 which denotes the orientation of the audio scene at the listener. At frame m−1, the user 101 makes the decision to draw the attention of the listener to the sound sources B and C by applying a rotation of the audio scene, this may be transmitted to the listener as a signal indicating a 90 degree change to the orientation (azimuth) of the scene. The change in orientation may be instigated by the user 101 as a command via a user interface. The change in orientation of the audio scene is seen to take place at the next frame m. Upon receiving frame m, the listener's 102 rendering equipment is shown as rendering instantaneously the 90 degree change to the azimuth orientation of the spatial audio scene in response to the signalling request from the user 101. At frame m, the listener is shown as experiencing an instant rotation of 90 degrees to the audio scene, and starts to experience the B and C sound sources at the front of the audio scene as depicted by the solid arrow 105. This instant change to the orientation of the audio scene may be subsequently disturbing and rather confusing to the listener 102. This is shown in FIG. 1 as 106.

Furthermore, due to the nature of encoding spatial audio scenes at low bit rates it may be preferable to avoid any scene orientation change coinciding with the encoding of, e.g., attack sounds in the audio signal such as the beginning of a speech burst.

Therefore, embodiments solve the problem of enabling robust transmission of spatial audio scenes when the scene orientation may be changed by a user's interaction without the unwanted effect of producing perceptually disturbing artefacts to the end listener.

Embodiments improve spatial audio rendering by avoiding any sudden changes to the scene orientation at the listener's device by delaying the signalling of the change of scene orientation and by signalling that a future change will take place thereby allowing the rendering device to provide sufficient time to apply a suitable form of compensation or smoothing.

Embodiments of the invention may be implemented within the framework of the Real-time Transport Protocol (RTP) which is used for transmitting digital media streams such as encoded audio over the Internet Protocol (IP). The parameters of the RTP payload are typically communicated between transmission end points using the Session Description Protocol (SDP).

Specific functionality may be implemented at the encoding device which can receive a user input to set a new orientation for a spatial audio scene. The encoding device may be arranged to respond to the request for an orientation change by selecting a suitable time window for the scene orientation change to take place, both at the encoding and the decoding/rendering devices. Thereby introducing a delay, such that an audio scene renderer does not respond with an instantaneous change to the audio scene. The suitable time window may be signalled to a receiving device including the decoder and renderer via signalling means such as the RTP protocol as discussed above. The receiving device may be arranged to respond to the signalled delay by performing a suitable smoothing or pre-compensation to counteract the effect of an instantaneous change to the scene orientation at the encoder.

The objective of the delay is to allow the receiving device, in particular the renderer, determine how to handle the orientation change. The encoder may then signal to the decoder/render a buffer length or compensation window which defines a delay window in which the scene orientation change can be handled by the decoder/renderer. The delay information sent to the decoder may take into account analysis of the content at the time of the scene change and also user preferences.

According to various embodiments of the invention the delay applied both at the encoder/capturer and decoder/render can be a fixed delay, an adaptive delay dependent on past, current or future signals.

Figure 2:
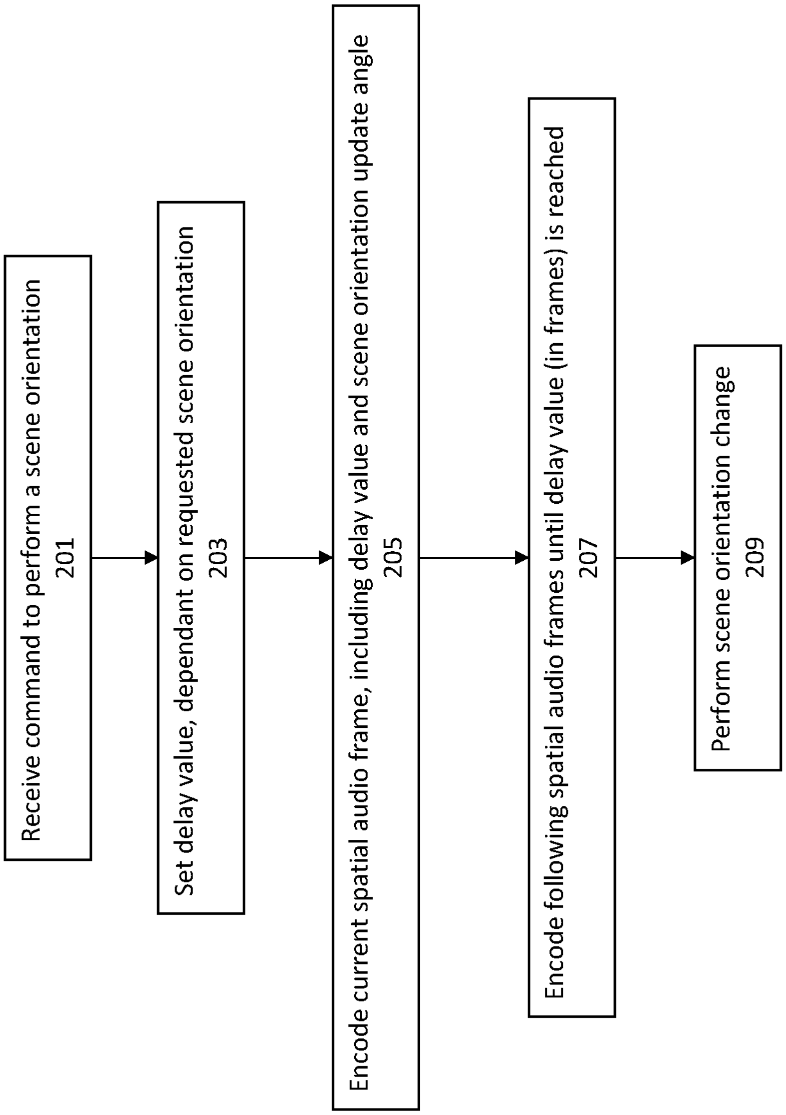
FIG. 2 shows a flow diagram of an operation of an encoder/capturer according to some embodiments.

In this regard FIG. 2 shows a flow diagram of the operation of an encoder/capturer according to some embodiments.

Initially the encoder is shown as receiving a command from a user indicating that a change in scene orientation/rotation is desired Step 201 in FIG. 2. This may be instigated by the user entering a command via a user interface which is coupled to the encoder.

In response to receiving the command the encoder may then set an appropriate delay in terms of the number of spatial audio frames, step 203 in FIG. 2.

In embodiments the delay value may be provided as a factor to the encoder/capturer, or equally the delay may be determined by the encoder/capturer.

The delay value may be dependent on the amount of orientation change that is to be applied to the audio scene. For example, a higher delay value may be used for larger changes to the orientation of the audio scene. For instance, the encoder/capturer may implement a table whereby a range of orientation change to a particular angle (whether it be azimuth or elevation) may be mapped to a specific delay in terms of the number of audio frames.

The encoder may then encode the current spatial audio frame. Additionally, encoding of the current audio frame may also include an encoded delay value and an encoded scene orientation update. Typically, the encoded scene orientation update will comprise at least one angle of rotation of the audio scene. Such as an azimuth value, elevation value or a roll value. This is shown as step 205 in FIG. 2.

The encoder may then encode the audio scene on a regular frame by frame basis for the required delay number of spatial audio frames. This may be performed in order that any coding memories remain synchronised between encoder and decoder. This is shown as processing step 207 in FIG. 2.

Finally, the encoder may perform the requested scene orientation change after the prescribed delay period. This is shown as processing step 209 in FIG. 2.

Figure 3:
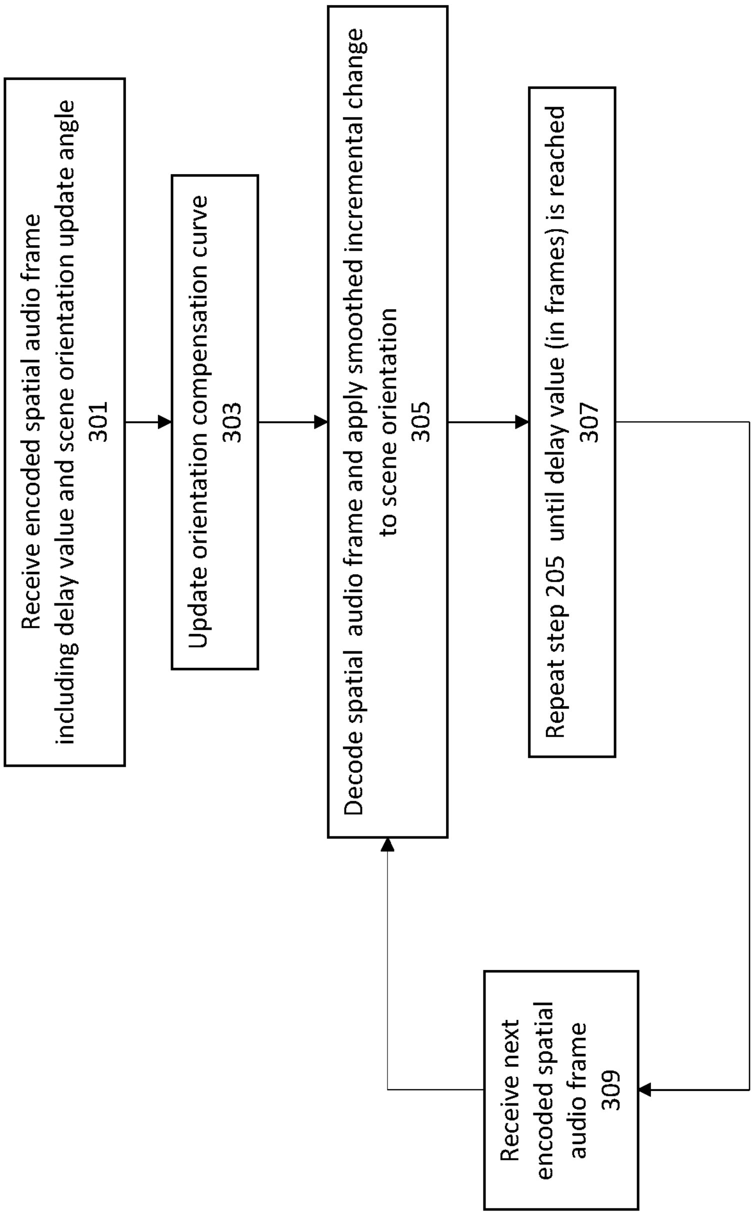
FIG. 3 shows a flow diagram of an operation of an decoder/rendered according to some embodiments.

FIG. 3 shows a flow diagram of the operation of a decoder/renderer according to some embodiments.

The decoder may be arranged to receive an encoded spatial audio frame together with a delay value and a scene orientation update information. This is shown processing step 301.

The decoder/renderer may then be arranged to update an orientation compensation curve. This is a function which enables a smooth transition from the current scene orientation to the upcoming scene orientation as received in the previous processing step 301. This is shown as processing step 303. The output of this step may in some embodiments be an incremental scene orientation change which can be applied on a frame by frame basis such that the full scene orientation change/rotation is achieved when the requisite number of delay frames has been reached. This is an example of a linear interpolation scheme where further details are given by the description accompanying FIG. 5. However other embodiments may deploy other methods of compensation as described in some of the following sections. For, instance a method of "reverse compensation" may be used as described below. Alternatively, other compensation mechanisms may be used in order to provide an incremental scene orientation change. For instance, the characteristics of the audio signal over the course of the delayed audio frames may be used to regulate the incremental scene orientation change/rotation. Again, this is discussed later on with reference to FIG. 7, where the output from a signal activity detector is used at the decoder/renderer to influence the amount of incremental delay on an audio frame by audio frame basis. The effect of using such schemes is that a non-linear incremental delay pattern is applied over the delay window. Whereby, for active regions of the audio signal the rate of change of the audio scene orientation may be "slowed" down, and for inactive regions the rate of change of the audio scene orientation may be "accelerated"

The decoder may then be arranged to decode the spatial audio frame and apply the incremental change to the scene orientation. This is shown as step 305 in FIG. 3.

The next encoded spatial audio frame may then be received, shown as processing step 309. The encoded spatial audio frame may be then decoded. The incremental scene orientation change may then be applied to the audio scene, processing step 305. This processing loop may be repeated until the delay value in terms of number of spatial audio frames is reached, processing step 307.

Consequently, by the time the delay value in terms of the number of spatial audio frames has been reached the orientation change to the audio scene will have been fully processed. Thereby producing a gradual change to the orientation of the audio scene at a granularity of the incremental change on a frame by frame basis.

The orientation change parameter metadata set as encoded by the encoder may contain as a minimum the following fields;

SceneDel. The number of audio frames over which the orientation change is to take place, which may be expressed as a delay D in terms of the number of spatial audio frames. In embodiments this may allocated an 8-bit field. The value of the 8-bit field being the delay (in terms of the number of frames). The value of 0 of the 8-bit field may represent the current frame. In other words there is no delay to the scene orientation update.

SceneAzi: The forward azimuth value, which may be given as an 8-bit value. This is the azimuth value of a reference forward position in the spatial audio scene space. The 360 degree range of the azimuth value may be linearly divided over the 0 to 255 possible values of the 8-bit number.

SceneEle: The forward elevation value, which also may be given as an 8-bit value. This is the elevation value of a reference forward position in the spatial audio scene, which together with the azimuth value may be used as a reference for angle of roll of the audio scene. The range of the 8-bit value (0 to 255) may be arranged to linearly divide the 180 degree arc of elevation. For example, in one embodiment the values from 0 to 127 may be used divide the arc of elevation from 0 to 90 degrees by linear increments, and the values from 128 to 255 may be used to divide the arc elevation from 0 to −90 degrees.

SceneRol: Audio scene roll value. This may be the angle of roll about the reference forward position given by the above azimuth and elevation values. As before this may be given as an 8-bit number, where the range of values 0 to 255 may be arranged to linearly divide the maximum roll angle of 360 degrees into linear increments.

SceneID: Additionally, some embodiments may have several components to the audio scene, in which case it is preferable to have a mechanism which enables a scene change for each component. In this case, the orientation change parameter metadata set may also have a SceneID field which can identify individually a change to a specific component of the audio scene change. Again this may be expressed as an 8-bit value.

In embodiments the above orientation parameters may be referred in the collective as the orientation_update (or orientation_change) metadata set.

In embodiments the orientation_update metadata set may be transported via the RTP protocol in accordance with the Internet Engineering Task Force (IETF) RFC 8285 "A General Mechanism for RTP Header Extensions." In some embodiments, which deploy the SceneID, the RTP header extension mechanism may also be arranged to transport the orientation scene ID information.

When considering RFC 8285 it may be possible to utilise either a one-byte header extension format or a two-byte header extension format. Below is a one-byte header extension format for transporting the orientation time and the orientation update, according to the framework of RFC 8285.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      0xBE     |      0xDE     |           length = 2          |
+-+-+-+-+-+-+-+-+-+-+-+-+-+-+-+-+-+-+-+-+-+-+-+-+-+-+-+-+-+-+-+-+
|  ID   | L = 4 |    SceneID    |    SceneDel   |    SceneAzi   |
+-+-+-+-+-+-+-+-+-+-+-+-+-+-+-+-+-+-+-+-+-+-+-+-+-+-+-+-+-+-+-+-+
|   SceneEle    |   SceneRol    |    0 (pad)    |    0 (pad)    |
+-+-+-+-+-+-+-+-+-+-+-+-+-+-+-+-+-+-+-+-+-+-+-+-+-+-+-+-+-+-+-+-+
```

The first two bytes 0xBE and 0xDE are used to identify the one-byte header form of the header extension according to RFC 8285. The next two bytes are the "length" field which gives the size of the data extension in terms of the number of whole 32-bit units (including any padding that may be needed to fill the 32-bit units.) In this example the data extension uses two 32-bit units to contain the data extension. This again is a field specified by RFC 8285. The next field is the single-byte extension field as specified by RFC 8285. This is split into two nibbles. The first nibble specifies a unique ID field and the second nibble is L whose value is related to the number of bytes of the data extension. These fields are again required by RFC 8285. The value of L plus one can be used to specify the number bytes required for the data extension. In embodiments L can be used as a form of embedded signaling where its value contains information relating to the orientation delay time (SceneDel), the scene change (sceneAzi, SceneEle and SceneRol) and orientation scene ID (SceneID). In some embodiments the orientation delay time, scene change and orientation scene ID may be encoded according to the following table.

| L | 0 | 1 | 2 | 3 | 4 |
|---|---|---|---|---|---|
| SceneID | x | x | x | x | x |
| SceneDel | | x | x | x | x |
| SceneAzi | | | x | x | x |
| SceneEle | | | | x | x |
| SceneRol | | | | | x |

In the above table, the symbol "x" denotes the specific orientation parameters contained in the RTP data set extension, and therefore the value of L can be used encode which specific orientation parameters of the orientation change parameter set are updated by the RTP packet. For example, when L takes the value of 2 the RTP header extension will contain updates to the SceneID, SceneDel and SceneAzi parameters. Similarly, with reference to the above one-byte header extension example. When L takes the value of 4, this signifies that the RTP header extension contains the following orientation parameter values, and therefore an update to, SceneID, SceneDel, SceneAzi, SceneEle and SceneRol.

Thus, in these embodiments the 4 bits allowed for the encoding of L (according to RFC 8285) allows for sufficient range of values to indicate a change to all 5 of the above orientation parameters. Note in RFC 8285, the 4-bit length allowed for L allows for up to 16 bytes of extension data.

According to RFC 8285 the local identifier (ID) in the stream may be negotiated or defined out of band, and each distinct extension, in other words the above orientation update may have a unique ID. For example, in embodiments the local identifier may be negotiated for the orientation_update metadata set using the session description protocol (SDP). For example, the above orientation_update may be negotiated to have the ID value of one. Using SDP signalling the negotiation may take the form of a=extmap: 1 http://3gpp.org/ivas/rtp_hdr_ext.htm#orientation_update.

The above SDP line uniquely describes the header extension with ID=1 using the unique URI http://3gpp.org/ivas/rtp_hdr_ext.htm#orientation_update.

Alternatively, each orientation parameter may be considered on an individual basis as an RTP header extension and therefore each of the orientation parameters may be assigned their own ID value.

For instance, the SceneID parameter may take the following RTP header extension.

Example URI: http://3gpp.org/ivas/rtp_hdr_ext.htm#scene_id

```
 0                   1
 0 1 2 3 4 5 6 7 8 9 0 1 2 3 4 5
+-+-+-+-+-+-+-+-+-+-+-+-+-+-+-+-+
|  ID   | L = 0 |    SceneID    |
+-+-+-+-+-+-+-+-+-+-+-+-+-+-+-+-+
```

The SceneDel parameter may take the following RTP header extension.

Example URI: http://3gpp.org/ivas/rtp_hdr_ext.htm#delay_ori

```
 0                   1
 0 1 2 3 4 5 6 7 8 9 0 1 2 3 4 5
+-+-+-+-+-+-+-+-+-+-+-+-+-+-+-+-+
|  ID   | L = 0 |    SceneDel   |
+-+-+-+-+-+-+-+-+-+-+-+-+-+-+-+-+
```

The SceneAzi parameter may take the following RTP header extension.

Example URI: http://3gpp.org/ivas/rtp_hdr_ext.htm#scene_azi

```
 0                   1
 0 1 2 3 4 5 6 7 8 9 0 1 2 3 4 5
+-+-+-+-+-+-+-+-+-+-+-+-+-+-+-+-+
|  ID   | L = 0 |    SceneAzi   |
+-+-+-+-+-+-+-+-+-+-+-+-+-+-+-+-+
```

The SceneEle parameter may take the following RTP header extension.

Example URI: http://3gpp.org/ivas/rtp_hdr_ext.htm#scene_ele

```
 0                   1
 0 1 2 3 4 5 6 7 8 9 0 1 2 3 4 5
+-+-+-+-+-+-+-+-+-+-+-+-+-+-+-+-+
|  ID   | L = 0 |    SceneEle   |
+-+-+-+-+-+-+-+-+-+-+-+-+-+-+-+-+
```

The SceneRol parameter may take the following RTP header extension

Example URI: http://3gpp.org/ivas/rtp_hdr_ext.htm#scene_rol

```
 0                   1
 0 1 2 3 4 5 6 7 8 9 0 1 2 3 4 5
+-+-+-+-+-+-+-+-+-+-+-+-+-+-+-+-+
|  ID   | L = 0 |    SceneRol   |
+-+-+-+-+-+-+-+-+-+-+-+-+-+-+-+-+
```

The relevant SDP lines for the above parameters may be formulated as, where each ID of 1 to 5 is uniquely assigned to a respective URIs:

```
a=extmap:1 http://3gpp.org/ivas/rtp_hdr_ext.htm#scene_id
a=extmap:2 http://3gpp.org/ivas/rtp_hdr_ext.htm#scene_del
a=extmap:3 http://3gpp.org/ivas/rtp_hdr_ext.htm#scene_azi
a=extmap:4 http://3gpp.org/ivas/rtp_hdr_ext.htm#scene_ele
a=extmap:5 http://3gpp.org/ivas/rtp_hdr_ext.htm#scene_rol.
```

Figure 4:
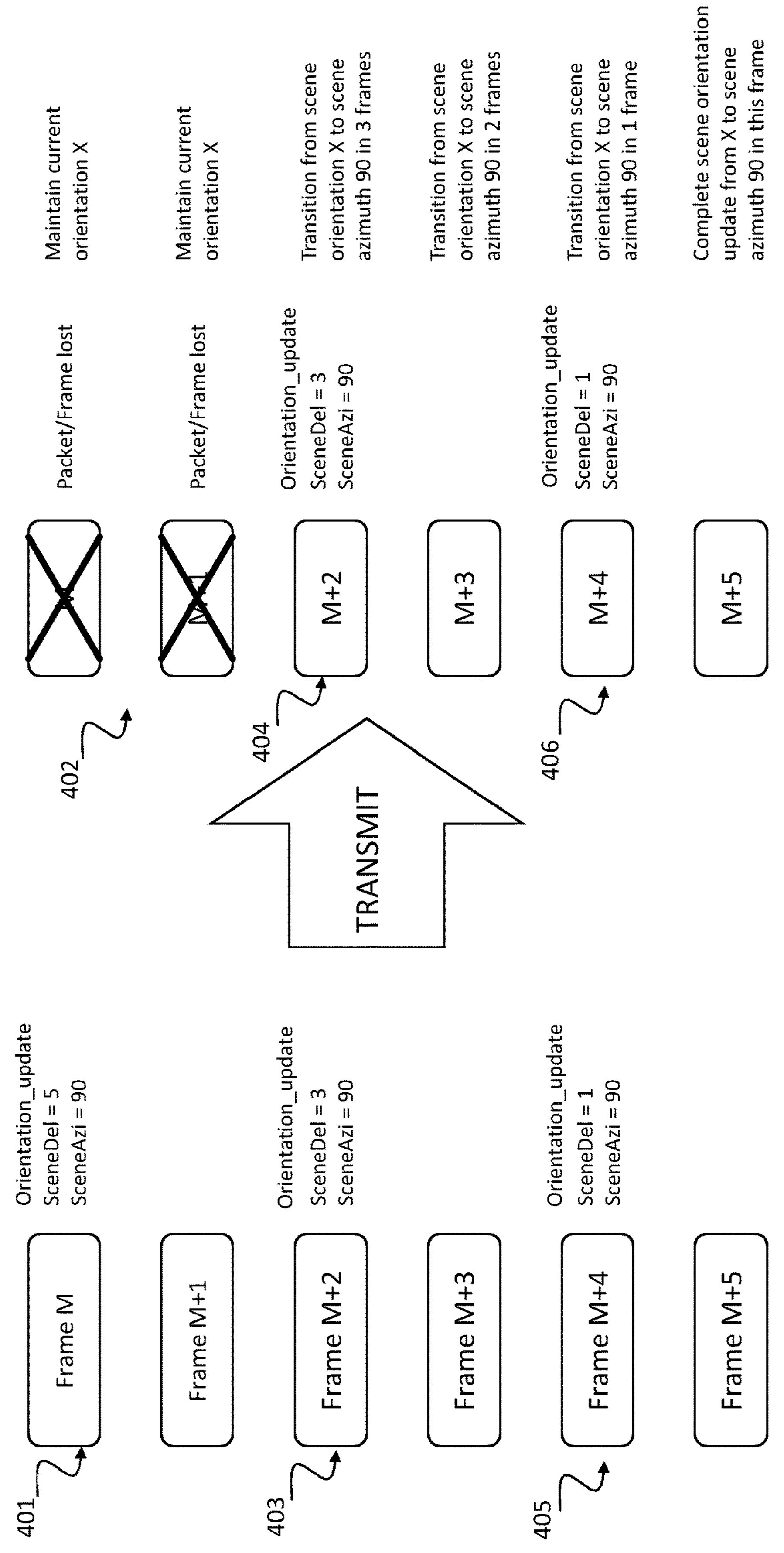
FIG. 4 shows a scenario of RTP packet loss whilst sending orientation update information.

Next, we turn to the problem of packet loss when signalling orientation_update metadata set information. To counteract the any effects of packet loss (or late arrival), an encoder may be arranged to incorporate some built in redundancy by repeating the signalling of the orientation_update information in subsequent transmitted packets/audio frames. In this case the encoder may be arranged to adjust the orientation delay parameter to compensate for the audio frames that have been previously transmitted with respect to the original orientation_update request. The repeat signalling of the orientation update with the corresponding adjustment to the delay value (SceneDel) may be performed until the transmission of the audio frame immediately before the audio frame in which the orientation change is due to take place. To that extent FIG. 4 depicts the scenario of RTP packet loss whilst sending orientation_update information. It is shown in FIG. 4, that an encoder may determine orientation_update comprising an orientation delay (SceneDel) and an orientation change (SceneAzi) to the azimuth angle. For example, it may be decided by the encoder (or by external means as discussed above) to be a delay (SceneDel) of 5 audio frames with a change to the azimuth value (SceneAzi) of 90 degrees. This orientation_update may be depicted in FIG. 4 as being transmitted in an RTP packet at Frame M 401. However, there may be some packet loss or corruption during transmission and the receiver fails to receive the RTP packet having frame M data (including the orientation_update information associated with frame M) and the following RTP packet having frame M+1 data. These lost frames are depicted as the lost packets 402 in FIG. 4. Accordingly, as these packets are lost, the decoder may be arranged to continue rendering the audio scene using the previously deployed scene orientation. FIG. 4 depicts the retransmission of the orientation_update information at frame M+2 as 403. At 403 the SceneDel value has been reduced by the number of previously transmitted frames, so for this example SceneDel has been reduced to 3 to compensate for the previous transmission of audio frames M and M+1. In FIG. 4 the RTP packet having audio frame M+2 is shown as being received by the receiver as 404. Consequently, at audio frame M+2 the decoder/renderer is aware that there is a change to the audio scene orientation in three frames time. FIG. 4, also shows frame M+4 being transmitted (405) with a repeat of the orientation_update information with the adjusted SceneDel value of 1. FIG. 4 depicts this as being received at the time associated with frame M+4 as 406. In embodiments, the decoder/renderer may simply use the safe receipt at frame M+4 as confirmation that the audio scene change is to occur in one frame's time, i.e. frame M+5. It is to be noted that if frame M+5 was also lost due to packet loss over the network, then the decoder/renderer is still aware of the impending audio scene change because of the safe receipt of the orientation_update information at frame M+2.

Alternatively, in other embodiments the encoder/transmitter may retransmit the orientation_update information (with an adjusted delay value) in response to a notification that packets have been lost. The encoder may then be arranged to retransmit the orientation_update information, with the appropriate adjustment to the SceneDel value, on the proviso that the response is received within the window of delay. In these embodiments the retransmission of the orientation update information may be performed, e.g., in response to a RTCP NACK message.

As an aside, the encoder/capturer may also be arranged to transmit orientation_update information for a current frame, that is with a SceneDel value of 0. This may be useful when the encoder/capturer wishes to force an instantaneous update to the orientation of the audio scene. For instance, an immediate request for an orientation change may be useful in the case to reset the audio scene orientation to a previous value or to a default orientation.

In embodiments the orientation_update information can have absolute orientation values, in which the scene orientation values such as SceneAzi, SceneEle and SceneRol are standalone values. Alternatively, other embodiments may deploy relative orientation values, in which scene orientation values such as SceneAzi, SceneEle and SceneRol are relative to a previous orientation update.

Having absolute orientation values for audio scene positioning may have the added effect of resetting the audio scene to a specific orientation upon executing the scene change at the decoder/renderer. Furthermore, absolute orientation values have the added effect of repeating the orientation_update after the delay period has expired. For instance, in some operating instances the decoder/renderer may not have received the orientation_update information within the delay window. By providing provision for the retransmission of the orientation_update information outside of the delay window would ensure that the decoder/renderer is aware of the missed information and therefore can determine how or indeed whether to transition to the new audio scene orientation.

When an orientation_update metadata set is received, the decoder/renderer may be arranged to have a transition mechanism which may determine how the change to the audio scene orientation is applied.

For instance, in embodiments the decoder/renderer may deploy a smooth transition mechanism whereby an audio scene orientation change is incrementally applied as a series of small adjustments to the audio scene until the target/signalled orientation change has been reached. This may be performed over a series of audio frames with an incremental change applied at each audio frame. Typically, the number of audio frames used for the transition may be determined by the received delay time, SceneDel, so that the full scene orientation change has been applied by the time the number of delay audio frames has been reached.

Figure 5:
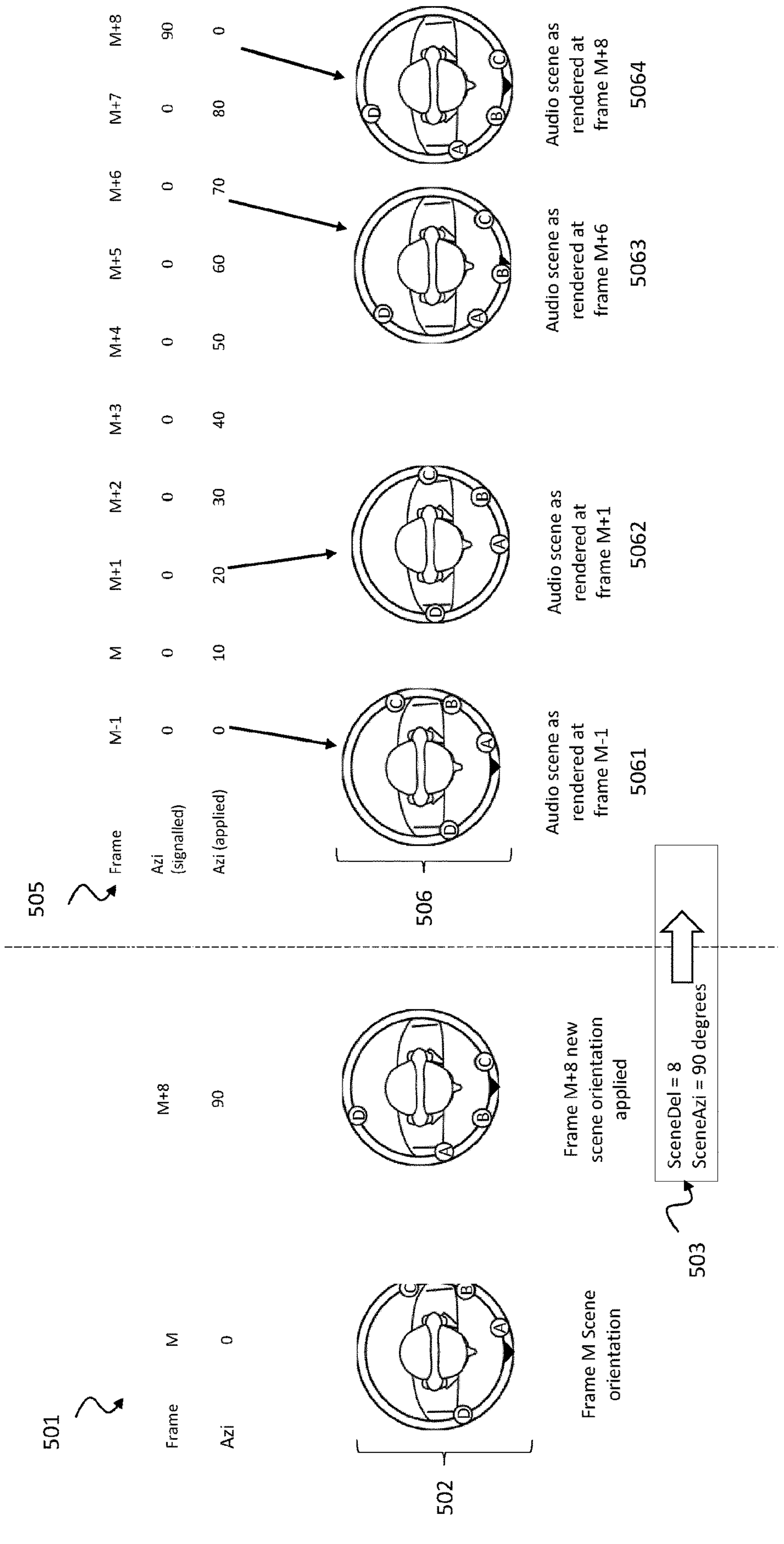
FIG. 5 shows an example of a delayed orientation update to the audio scene according to some embodiments.

An example of a smooth transition mechanism is shown in FIG. 5, where the encoder side 501 has determined that a 90-degree clockwise orientation change to the azimuth of the audio scene should take place at the decoder/renderer in a delay of eight frames. In this case the orientation_update metadata set sent via the above RTP header extension may have at least the following scene orientation values SceneDel=8 and SceneAzi=90, this is shown as 503 in FIG. 5. Note the value for the SceneAzi will be the binary number which is mapped to the angle value of 90 degrees. At the encoder 501 this is shown by a user 502 having a specific orientation at frame M. The same user 502 (at the encoder) is then shown as having the 90-degree change to the scene orientation at frame M+8.

Note in this example, that the convention of a positive angle corresponding to a clockwise rotation n is followed.

The decoder side is shown as 505 in FIG. 5. The user 506 at the decoder is shown initially as having the same audio scene orientation as that of the encoder at the frame M−1. This is depicted as 5061 in FIG. 5. At frame M the user 506 then receives the orientation_update metadata set containing the change to the scene orientation. At this point the renderer for user 506 will then start to perform a smooth transition to the audio scene over the course of the SceneDel number of audio frames. In this case the azimuth angle of the audio scene change (90 degrees) is incrementally changed over the course of the 8 audio frames starting at the frame M, the audio frame in which the orientation_update is signalled. The increment of change may be chosen such that the change to the orientation has been implemented by the time the delay has been reached. In embodiments this change can be a linear incremental change across the audio frames, whereby the same increment change to the audio scene is applied for each audio frame until the audio frame coinciding with the delay has desired audio scene change. As a rule of thumb, the incremental change applied at each audio frame may be determined as Incremental change=audio scene angle change/(audio delay in frames+1)

Therefore, returning to the example of FIG. 5, the incremental change applied at each audio frame may be given as SceneAzi/(SceneDel+1). This incremental change across the delay period in audio frames may be shown in FIG. 5 as starting at the frame M where the first incremental change of 10 degrees is applied. The audio scene at frame M+1 is shown as having a cumulative 20 degree change to the azimuth orientation 5062, that is a further 10 degree change beyond the change applied at frame M. The audio scene at frame M+6 5063 is shown as having a cumulative change of 70 degrees. Finally, the audio scene at frame M+8 5064 has reached the prescribed change to the azimuth of 90 degrees. This 90-degree change is carried out in the audio scene itself (as seen on the encoder side 501), and therefore no further adjustment is applied by the renderer, as shown by the value 0 at frame M+8.

Figure 6:
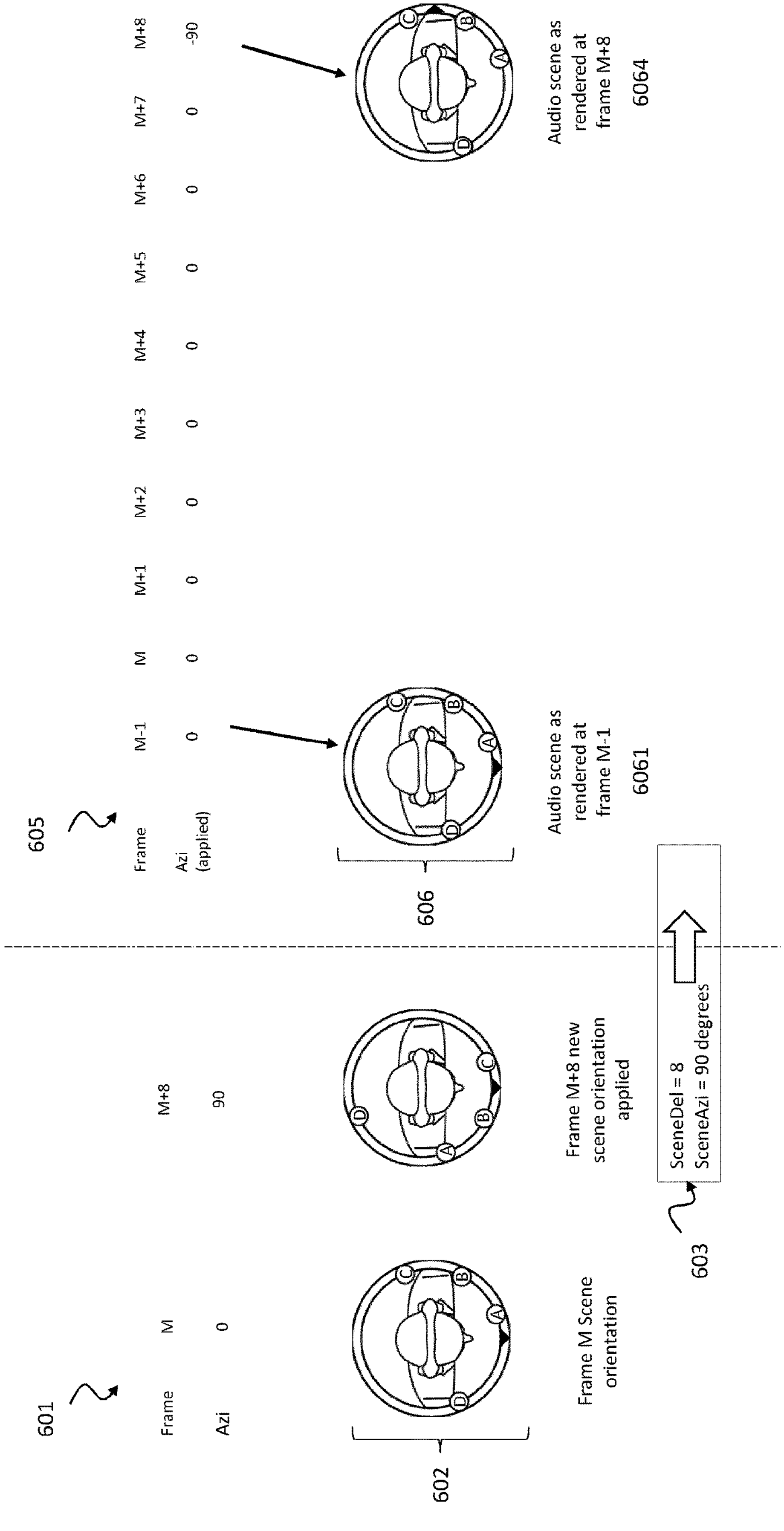
FIG. 6 shows an example of a delayed orientation update to the audio scene using reverse compensation.

In other instances, the decoder/renderer may behave differently when a request for an orientation_update is received. For example, the decoder/renderer may choose to effectively ignore the orientation_update request in accordance with user preferences. This particular use case is depicted in FIG. 6, where the encoder side 601 has determined that a 90-degree clockwise orientation change to the azimuth of the audio scene should take place at the decoder/renderer at a delay of eight frames. As before, the orientation_update metadata set sent at frame M via the above RTP header extension may at least comprise the following scene orientation values SceneDel=8 and SceneAzi=90, this is shown as 603 in FIG. 6. The encoder side 601 will then perform the orientation change to the audio scene at the frame M+8. This is shown by the user 602 exhibiting the 90-degree change to the azimuth of the scene orientation at frame M+8.

The decoder side is shown as 605 in FIG. 6. The user 606 at the decoder/renderer is shown as having the same audio scene orientation as that of the encoder at the frame M−1. This is depicted as 6061 in FIG. 5. At frame M the user 606 then receives the orientation_update metadata set containing the change to the scene orientation. Unlike the previous example laid out in FIG. 5, the user 606 may effectively ignore the request to change the orientation of the audio scene and maintain the existing audio scene orientation at the decoder/renderer 605. This is shown by the user at frame M−1 having an orientation 6061 and the same user at frame M+8 6062 exhibiting the same orientation. The arrow in 6062 depicts the orientation of the audio scene at the encoder. This mode of operation as laid out in FIG. 6, maybe referred to as a reverse compensation because the effect of the scene change as requested by the encoder is not acted on by the decoder/renderer, in effect the change request is reversed. For example, in this case the decoder/renderer performs a −90-degree (or 270-degree) rotation starting at frame M+8 to counter the encoder side 90-degree orientation change (on the azimuth).

Figure 7:
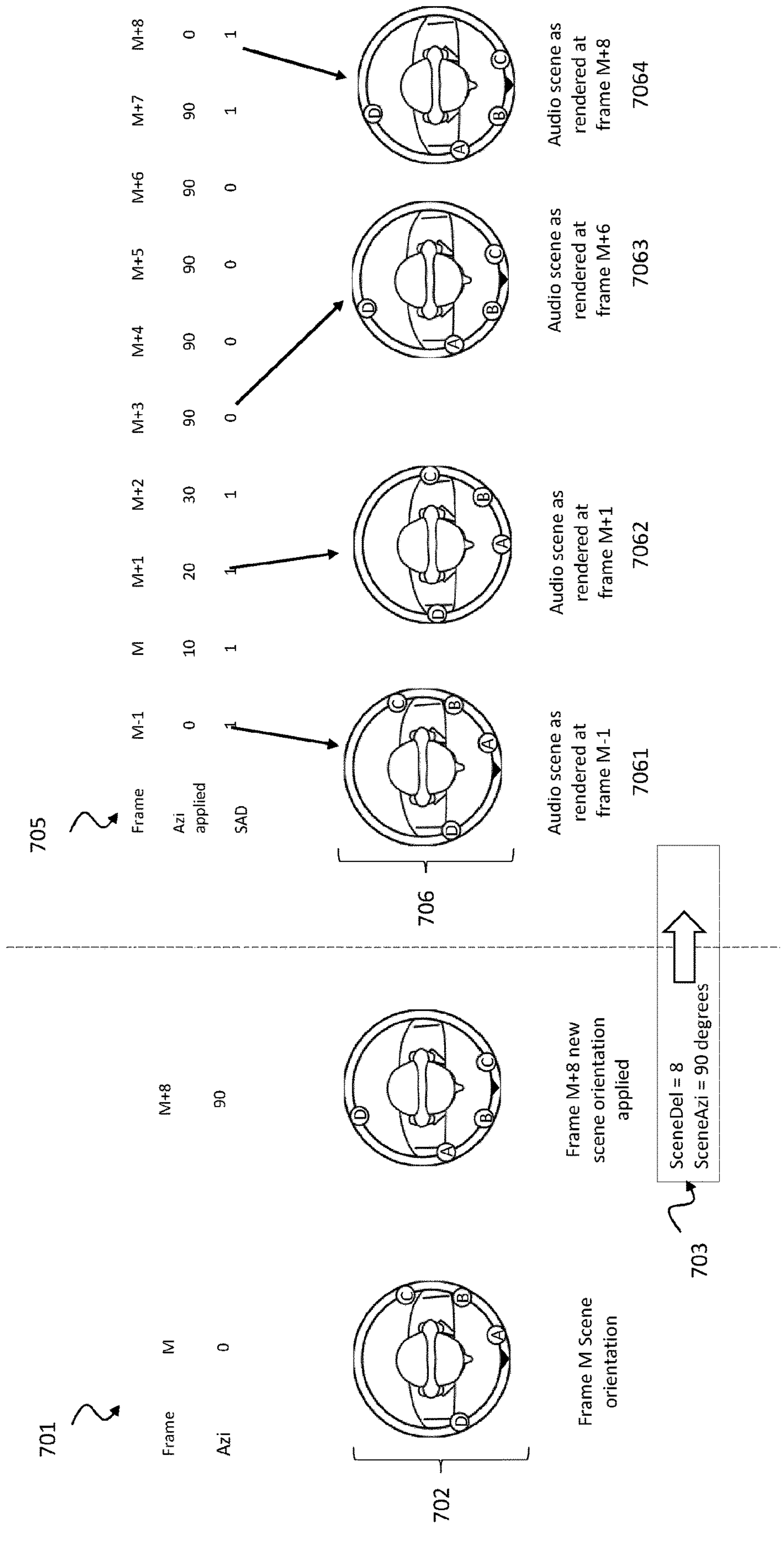
FIG. 7 shows an example of a delayed orientation update to the audio scene with a signal activity detector (SAD)

In embodiments the smooth transition mechanism as shown in FIG. 5, may be further enhanced by using an audio signal activity detector (SAD) which can be used to determine whether the audio signal can be classified as an active audio signal or an inactive audio signal. The field of signal activity detection (SAD) or voice activity detection (VAD) are common knowledge for persons skilled in the art of audio coding. In these embodiments a SAD may be used at the decoder to determine whether the orientation change can take place before the delay period. For instance, it may be advantageous to ensure that the orientation change has been fully executed during a frame when the audio signal is classified as being inactive rather than waiting for the end of the delay period. This is based on the premise that during inactive audio signal frames any sudden changes to the scene orientation will be not be noticed by the user at the decoder/renderer. The use of a SAD at the decoder/renderer for determining when to change the scene orientation may be integrated into existing transition mechanism. For example, the user at the decoder/renderer may receive a request to perform an audio scene change with a specific delay. The decoder/renderer may then determine an incremental delay (as shown above) to determine a smooth transition of the orientation of the audio scene across the audio frames of the delay window. However, in instances when the SAD detects that the audio signal is inactive during the delay window, the decoder/renderer may be arranged to perform the remaining orientation change as a single change over the course of an audio frame. Thereby facilitating a change to the audio scene orientation before the end of the delay window is reached. In some embodiments there may be a degree of hysteresis introduced whereby the orientation change at the point of the SAD indicating an inactive signal state is delayed by a frame or two in order to iron out any fluctuations in the signal state. This aspect of the invention may be further illustrated by FIG. 7 which depicts the smooth transition mechanism of FIG. 5 with the incorporation of a SAD. In this regard reference is made to FIG. 7 in which the encoder side 701 is seen as transmitting the orientation_update message 703 at frame M to the decoder/renderer 705. The user at the encoder is depicted as 702 where at the frame M+8, i.e. the audio frame at which the delay period expires, the encoder performs the orientation_update change to the audio scene. The decoder/renderer 705 is shown as receiving the change at frame M where the user 706 at the decoder/renderer is shown as starting to perform an incremental change to the orientation of the audio scene as per the situation in FIG. 5. 7061 simply depicts the audio scene from the perspective of the user at audio frame M−1, i.e. before receipt of the orientation_update request at frame M. The incremental change to the audio scene is applied over frames M, M+1 and M+2 with 7062 showing the cumulative of 20 degrees from the perspective of the user at the audio frame M+1. At frame M+3 the SAD detects that the audio signal is in an inactive state, at this frame the decoder/renderer performs the remaining change to the orientation of the audio scene. This is depicted in FIG. 7 as 7063 where it the user is shown as having the full change to the orientation of the audio scene. Finally, FIG. 7 also shown the user 7064 from the perspective of the frame at the end of the delay period (M+8), where it can be seen orientation of the audio scene is the same as the orientation at audio frame M+3. Note in this example no hysteresis has been applied.

As described above the delay sent to the decoder may be set by the encoder, e.g., as a fixed delay or may be based on particular rules or set in response to an external control signal. For example, a particular user selection at the encoder, a particular multimedia service or a particular orientation change to the audio scene may each trigger a specific and predetermined value for the delay.

Alternatively, the delay value may be adaptive at the encoder in the sense that the signal may be monitored for various levels of activity with a SAD or a VAD, rather like the above example of FIG. 7 in which the delay is responsive to a SAD at the decoder. By using a SAD at the encoder allows for instances when the audio signal at the encoder is inactive then a shorter delay period may be selected than might otherwise have been selected if the signal was deemed to have been in an active state. Therefore, the encoder side may, e.g., firstly indicate a first delay value (e.g., 20 frames) and based on a SAD value later indicate a new orientation_update corresponding to a second delay value (e.g., 0 frames) before reaching the originally signalled frame.

Furthermore, the system may be designed such that an intended orientation_update change sent to the decoder may be overridden by a subsequent orientation_update change sent from the encoder providing the earlier change has not been fully performed. In order for this to function the encoder side may need to be keeping an internal state count of the orientation transitions taking place at the decoder, so that both sides can maintain a level of synchronisation. Therefore, any overriding orientation_update messages sent from the encoder to decoder may need to take into account the transition states at the decoder.

Figure 8:
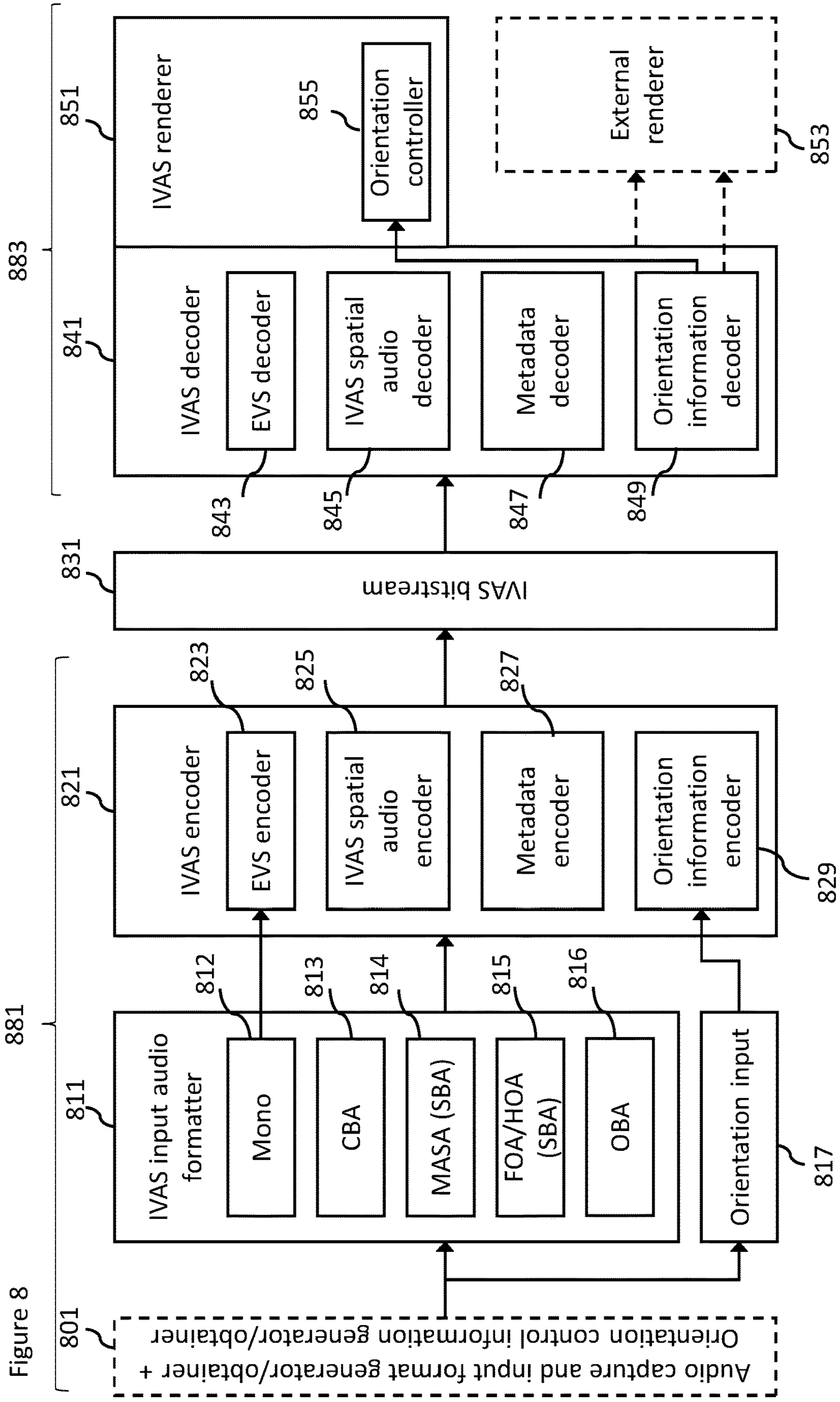
FIG. 8 shows an example IVAS codec data path according to some embodiments.

With respect to FIG. 8 an example system within which embodiments may be implemented. Furthermore, with respect to FIG. 8 is shown an example capture apparatus or device and an example rendering or playback device within the system.

Thus, with respect to the capture apparatus 8811 there is shown an audio capture and input format generator/obtainer+orientation control information generator/obtainer 901. In embodiments the aforementioned may be arranged in a single device or alternatively they may be arranged across several different processing modules. The audio capture and input format generator/obtainer+orientation control information generator/obtainer 801 is configured to obtain the audio signals and furthermore the orientation control information. The audio signals may be passed to an IVAS input audio formatter 811 and the orientation control information passed to an orientation input 817.

The capture apparatus 881 may furthermore comprise an IVAS input audio formatter 811 which is configured to receive the audio signals from the audio capture and input format generator/obtainer+orientation control information generator/obtainer 801 and format it in a suitable manner to be passed to an IVAS encoder 821. The IVAS input audio formatter 811 may for example comprise a mono formatter 812, configured to generate a suitable mono audio signal. The IVAS input audio formatter 811 may further comprise a CBA (channel based audio signal, for example a 5.1 or 7.1+4 channel audio signals) formatter configured to generate a CBA format and pass it to a suitable audio encoder. The IVAS input audio formatter 911 may further comprise a metadata assisted spatial audio, MASA (SBA—(parametric) scene based audio), formatter configured to generate a suitable MASA format signal and pass it to a suitable audio encoder. The IVAS input audio formatter 811 may further comprise a first order ambisonics/higher order ambisonics (FOA/HOA (SBA)) formatter configured to generate a suitable ambisonic format and pass it to a suitable audio encoder. The IVAS input audio formatter 811 may further comprise an object based audio (OBA) formatter configured to generate an object audio format and pass it to a suitable audio encoder.

The capture apparatus 881 may furthermore comprise an orientation input 817 configured to receive the orientation control information and format it/pass it to an orientation information encoder 829 within the IVAS encoder 821.

The capture apparatus 881 may furthermore comprise an IVAS encoder 821. The IVAS encoder 821 can be configured to receive the audio signals and the orientation information and encode it in a suitable manner to generate a suitable bitstream, such as an IVAS bitstream 831 to be transmitted or stored.

The IVAS encoder 821 may in some embodiments comprise an EVS encoder 823 configured to receive a mono audio signal, for example from the mono formatter 812 and generate a suitable EVS encoded audio signal.

The IVAS encoder 821 may in some embodiments comprise an IVAS spatial audio encoder 825 configured to receive a suitable format input audio signal and generate suitable IVAS encoded audio signals.

The IVAS encoder 821 may in some embodiments comprise a metadata encoder 827 configured to receive spatial metadata signals, for example from the MASA formatter 814 and generate suitable metadata encoded signals.

The IVAS encoder 821 may in some embodiments comprise orientation information encoder 829 configured to receive the orientation information, for example from the orientation input 817 and generate suitable encoded orientation information signals.

The encoder 821 thus can be configured to transmit the information provided in the orientation input according to its capability to the decoder for rendering with user control. User control is allowed via interface to IVAS renderer or an external renderer.

Thus, with respect to the renderer or playback apparatus 883 there is shown an IVAS decoder 841. The IVAS decoder 841 can be configured to receive the encoded audio signals and orientation information and decode it in a suitable manner to generate a suitable decoded audio signals and orientation information.

The IVAS decoder 841 may in some embodiments comprise an EVS decoder 843 configured to generate a mono audio signal from the EVS encoded audio signal.

The IVAS decoder 841 may in some embodiments comprise an IVAS spatial audio decoder 845 configured to generate a suitable format audio signal from IVAS encoded audio signals.

The IVAS decoder 841 may in some embodiments comprise a metadata decoder 847 configured to generate spatial metadata signals from metadata encoded signals.

The IVAS decoder 841 may in some embodiments comprise an orientation information decoder 849 configured to generate orientation information from encoded orientation information signals.

In some embodiments the renderer or playback apparatus 883 comprises an IVAS renderer 851 configured to receive the decoded audio signals, decoded metadata and decoded orientation information and generate a suitable rendered output to be output on a suitable output device such as headphones or a loudspeaker system. In some embodiments the IVAS renderer comprises an orientation controller 855 which is configured to receive the orientation information and based on the orientation information (and in some embodiments also user inputs) control the rendering of the audio signals.

In some embodiments the IVAS decoder 841 can be configured to output the orientation information from the orientation information decoder and audio signals to an external renderer 853 which is configured to generate a suitable rendered output to be output on a suitable output device such as headphones or a loudspeaker system based on the orientation information.

Figure 9:
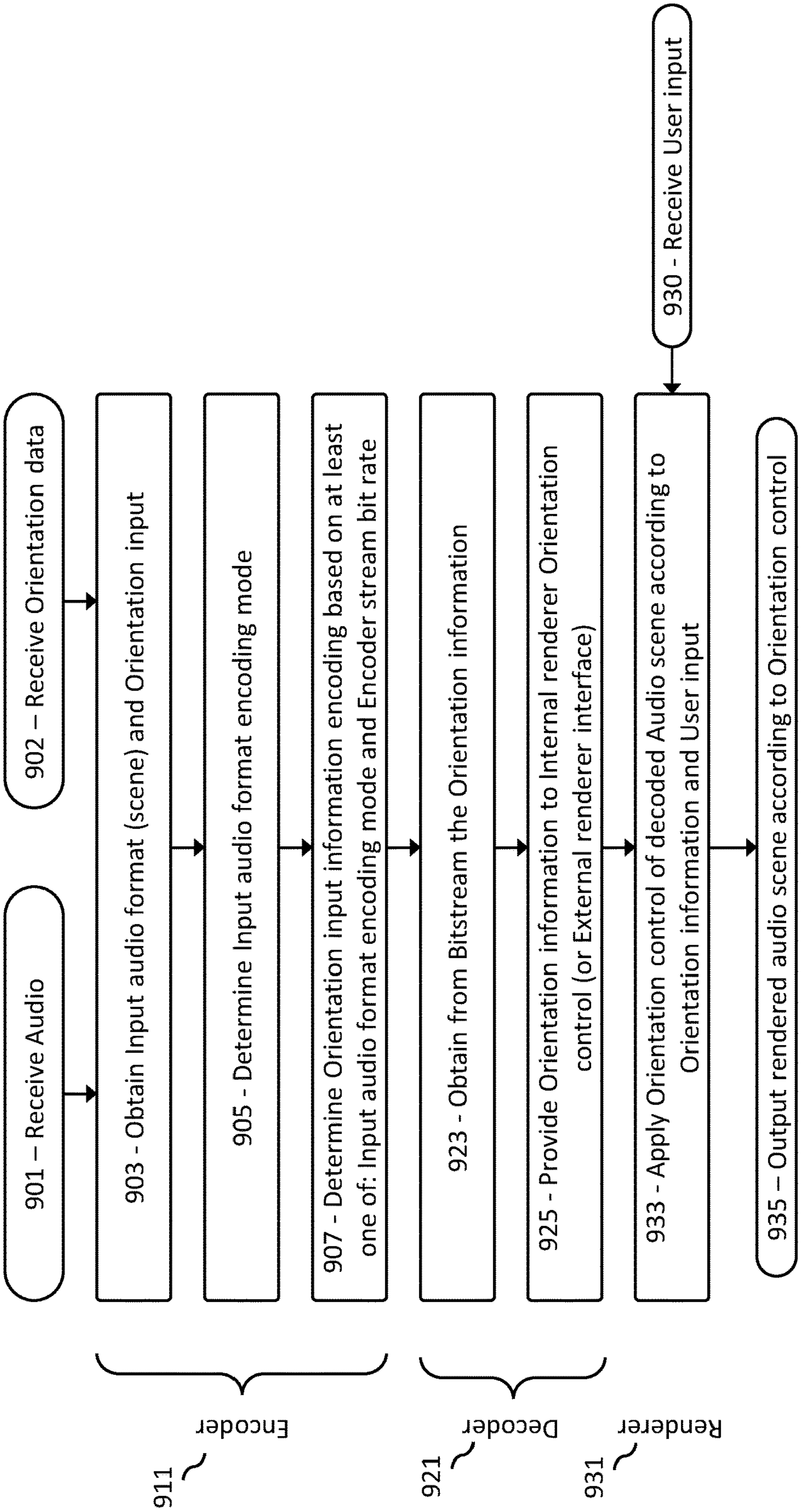
FIG. 9 shows a flow chart of operations of the example IVAS codec data path as shown in FIG. 9 according to some embodiments.

The summary of the operations of the system as shown in FIG. 8 and with respect to the orientation information aspects are shown in FIG. 9.

For example, the system may receive audio signals as shown in FIG. 9 by step 901.

Furthermore, it may be received orientation information or orientation data as shown in FIG. 9 by step 902.

There then follows a series of encoder or capture method operations 911.

These operations may comprise obtaining an input audio format (for example, an audio scene corresponding to any suitable audio format) and orientation input format as shown in FIG. 9 by step 903.

The next operation may be one of determining an input audio format encoding mode as shown in FIG. 9 by step 905.

Then there may be an operation of determining an orientation input information encoding based on at least one of an input audio format encoding mode and encoder stream bit rate (i.e., encoding bit rate) as shown in FIG. 9 by step 907.

The system may furthermore perform decoder operations 921.

The decoder operations may for example comprise obtaining from the bitstream the orientation information as shown in FIG. 9 by step 923.

Additionally, there may be an operation of providing orientation information to an internal renderer orientation control (or to a suitable external renderer interface) as show in FIG. 9 by step 925.

With respect to the rendering operations 931 there may be an operation of receiving a user input 930 and furthermore applying orientation control of decoded audio signals (the audio scene) according to the orientation information and user input as shown in FIG. 9 by step 933.

The renderer audio scene according to the orientation control can then be output as shown in FIG. 9 by step 935.

Figure 10:
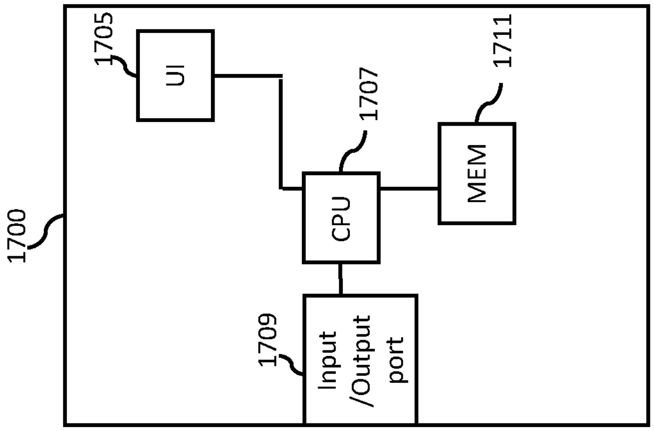
FIG. 10 shows an example device suitable for implementing the apparatus shown in previous figures.

With respect to FIG. 10 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory

1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals.

In some embodiments the device 1700 may be employed as at least part of the synthesis device. The input/output port 1709 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for decoding a spatial audio scene, comprising at least one processor and at least one memory including computer program code, the at least one memory and the computer program code configured to, with the at least one processor, cause the apparatus to:

receive an orientation change data set, wherein the orientation change data set comprises: at least one orientation change value specifying a change to an orientation of the apparatus with respect to the spatial audio scene comprising at least one audio signal; and an orientation change delay time for the change to the orientation of the apparatus; and perform the change to the orientation of the apparatus, wherein the change to the orientation of the apparatus is performed within a period of time specified by the orientation change delay time, wherein the apparatus caused to perform the change to the orientation of the apparatus is caused to determine an increment of change with respect to the at least one orientation change value.

2. The apparatus as claimed in claim 1, wherein the orientation change delay time is expressed in units of audio frames of the at least one audio signal.

3. The apparatus as claimed in claim 1, wherein the increment of change is a linear increment of change, wherein the apparatus caused to determine the increment of change is caused to determine a factor relating to a ratio of the at least one orientation change value to the orientation delay time.

4. The apparatus as claimed in claim 1, wherein the apparatus caused to perform the change to the orientation of the apparatus is further caused to:

apply the increment of change to the orientation of the apparatus on an audio frame by audio frame basis of the at least one audio signal for the period of time specified by the orientation change delay time.

5. The apparatus as claimed in claim 1, wherein the apparatus comprises a signal activity detection function, and wherein the apparatus caused to perform the change to the orientation of the apparatus if further caused to:

apply the increment of change to the orientation of the apparatus on an audio frame by audio frame basis of the at least one audio signal when the signal activity function indicates an active audio signal state; and apply a change to the orientation of the apparatus such that the at least one orientation change value is reached over a period of an audio frame of the at least one audio signal when the signal activity detection function indicates an inactive audio signal.

6. The apparatus as claimed in claim 1, wherein the apparatus caused to perform the change to the orientation of the apparatus comprises is further caused to:

override the change to the orientation of the apparatus by not performing the change to the orientation of the apparatus.

7. The apparatus as claimed in claim 1, wherein the at least one orientation change value comprises at least one of: an azimuth value, an elevation value and a roll value.

8. The apparatus as claimed in claim 1, wherein the orientation change data set is received in the form of a Real-Time Transport Protocol (RTP) header extension according to RFC8285.

9. The apparatus as claimed in claim 8, wherein the RTP header extension comprises a L field according to RFC 8285, and wherein a value of the L field indicates that the RTP header extension contains at least one of the azimuth value, the elevation value, the roll value and the orientation change delay time.

10. The apparatus as claimed in claim 8, wherein the RTP header extension is a one-byte header extension according to RFC8285.

11. A method for decoding a spatial audio scene, comprising:

receiving an orientation change data set, wherein the orientation change data set comprises: at least one orientation change value specifying a change to an orientation of an apparatus with respect to the spatial audio scene comprising at least one audio signal; and an orientation change delay time for the change to the orientation of the apparatus; and performing the change to the orientation of the apparatus, wherein the change to the orientation of the apparatus is performed within a period of time specified by the orientation change delay time, wherein performing the change to the orientation of the apparatus comprises determining an increment of change with respect to the at least one orientation change value.

12. The method as claimed in claim 11, wherein the orientation change delay time is expressed in units of audio frames of the at least one audio signal.

13. The method as claimed in claim 11, wherein the increment of change is a linear increment of change, wherein determining the increment of change comprises determining a factor relating to a ratio of the at least one orientation change value to the orientation delay time.

14. The method as claimed in claim 11, wherein performing the change to the orientation of the apparatus further comprises:

applying the increment of change to the orientation of the apparatus on an audio frame by audio frame basis of the at least one audio signal for the period of time specified by the orientation change delay time.

15. The method as claimed in claim 11, wherein the apparatus comprises a signal activity detection function, and wherein performing the change to the orientation of the apparatus further comprises:

applying the increment of change to the orientation of the apparatus on an audio frame by audio frame basis of the at least one audio signal when the signal activity function indicates an active audio signal state; and applying the change to the orientation of the apparatus such that the at least one orientation change value is reached over a period of an audio frame of the at least one audio signal when the signal activity detection function indicates an inactive audio signal.

16. The method as claimed in claim 11, wherein performing the change to the orientation of the apparatus further comprises:

overriding the change to the orientation of the apparatus by not performing the change to the orientation of the apparatus.

17. The method as claimed in claim 11, wherein the at least one orientation change value comprises at least one of: an azimuth value, an elevation value and a roll value.

18. The method as claimed in claim 11, wherein the orientation change data set is received in the form of a Real-Time Transport Protocol (RTP) header extension according to RFC8285.

19. The method as claimed in claim 18, wherein the RTP header extension comprises a L field according to RFC 8285, and wherein a value of the L field indicates that the RTP header extension contains at least one of the azimuth value, the elevation value, the roll value and the orientation change delay time.

20. The method as claimed in claim 18, wherein the RTP header extension is a one-byte header extension according to RFC8285.

* * * * *